(12) United States Patent
Kartik

(10) Patent No.: US 7,306,183 B1
(45) Date of Patent: Dec. 11, 2007

(54) SELF-CENTERING TAPE GUIDE FOR REDUCED EDGE FLANGE CONTACT IN A TAPE CARTRIDGE

(75) Inventor: Venkataraman Kartik, Pittsburgh, PA (US)

(73) Assignee: Storage Technology Corporation, Louisville, CO (US)

( * ) Notice: Subject to any disclaimer, the term of this patent is extended or adjusted under 35 U.S.C. 154(b) by 402 days.

(21) Appl. No.: 11/074,134

(22) Filed: Mar. 7, 2005

(51) Int. Cl.
*G11B 23/107* (2006.01)

(52) U.S. Cl. ...................................... 242/348; 360/132

(58) Field of Classification Search ............. 242/346.1, 242/346.2, 348, 348.2, 348.3; 360/132
See application file for complete search history.

(56) References Cited

U.S. PATENT DOCUMENTS 7,000,862 B2 * 2/2006 Takahashi ................ 242/348.2

OTHER PUBLICATIONS

U.S. Appl. No. 11/027,543, Kartik, Guide for Directing Tape Media Along Tape Path with Reduced Contact Between Guide and Tape Edge, filed Dec. 30, 2004.

* cited by examiner

Primary Examiner—John Q. Nguyen
(74) Attorney, Agent, or Firm—Brooks Kushman P.C.

(57) ABSTRACT

A system of rollers and guides that adjust a wrap angle of tape around a guide in a tape cartridge. The system of rollers is an outer guide and an inner roller connected to a spindle via rigid arms. The tape extends around the reel and around a portion of the outer diameter of the outer guide. The inner roller rolls against the tape pack as the tape is wound or unwound around the reel. As the radius of the tape pack changes, position of the inner roller relative to the reel changes, causing the spindle to rotate. In turn, the rotation of the spindle causes a change in the position of the outer guide relative to the reel. As outer guide moves inwardly or outwardly relative to the reel, the wrap angle of the tape around the outer guide changes.

16 Claims, 4 Drawing Sheets

SELF-CENTERING TAPE GUIDE FOR REDUCED EDGE FLANGE CONTACT IN A TAPE CARTRIDGE

CROSS-REFERENCE TO RELATED APPLICATION

The present invention is related to the following applications entitled Guide for Directing Tape Media Along Tape Path with Reduced Contact Between Guide and Tape Edge, Ser. No. 11/027,543 filed on Dec. 30, 2004.

BACKGROUND OF THE INVENTION

1. Field of the Invention

The inventions described herein relate to tape guides used with tape cartridges. In particular, the inventions described herein relate to roller and guide system adapted to adjust the wrap angle of tape around a tape guide.

2. Background of the Invention

Demand for increased data storage capacity and speed in tape storage systems has driven the development of tape cartridges having very thin tape and high reel speeds. However, decreasing the thickness of tape and increasing reel speed makes guiding tape difficult as the tape moves within the cartridge. In addition, if the edges of the tape strike or drag along parts of the cartridge, then the edges will wear. In turn, the lifetime of the tape is reduced and valuable data may be lost if the tape becomes damaged. Furthermore, impacts between the tape edges and various parts of the tape cartridge may lead to tape motion that is difficult for the head-servo to follow at high reel speeds, thereby leading to read/write errors.

The problems of wear along the edges of tape and read/write errors may be mitigated by the use of flangeless guides described in our application Self-Centering Tape Guide for Transport of Tape Media in a Tape Path with Reduced Contact Between Tape Edge and Guide Flanges, U.S. patent application Ser. No. 11/027,543, filed Dec. 30, 2004, which is hereby incorporated by reference. However, methods and devices for further reducing tape edge impact and further reducing tape edge wear would be useful to allow a further decrease in tape thickness and allow higher reel speeds for tape storage systems.

SUMMARY OF THE INVENTION

The present invention provides for a system of rollers and guides that adjust a wrap angle of tape around a guide in a tape cartridge. The roller and guide system is an outer guide and an inner roller, both of which are connected to a spindle via rigid arms. The tape extends around a reel, around a portion of the outer diameter of the outer guide, optionally around a portion of the outer diameter of the third guide, and then out of an opening in the tape cartridge. The inner roller rolls against the tape pack as the tape winds and unwinds around the reel.

The radius of the tape pack changes as the tape winds or unwinds around the reel. As the radius of the tape pack changes, the inner roller moves a distance relative to the reel. The motion of the inner roller causes the spindle to rotate. In turn, the rotation of the spindle causes the outer guide to move relative to reel. As the outer guide moves inwardly or outwardly relative to the reel, the wrap angle of the tape around the outer guide changes.

In an illustrative embodiment, a predetermined wrap angle is maintained around a self-centering guide in order for the tape to be positioned effectively around the guide. By maintaining the wrap angle within a predetermined range, the self-centering guide can effectively position the tape such that impacts between the tape edges and other components of the cartridge are reduced.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
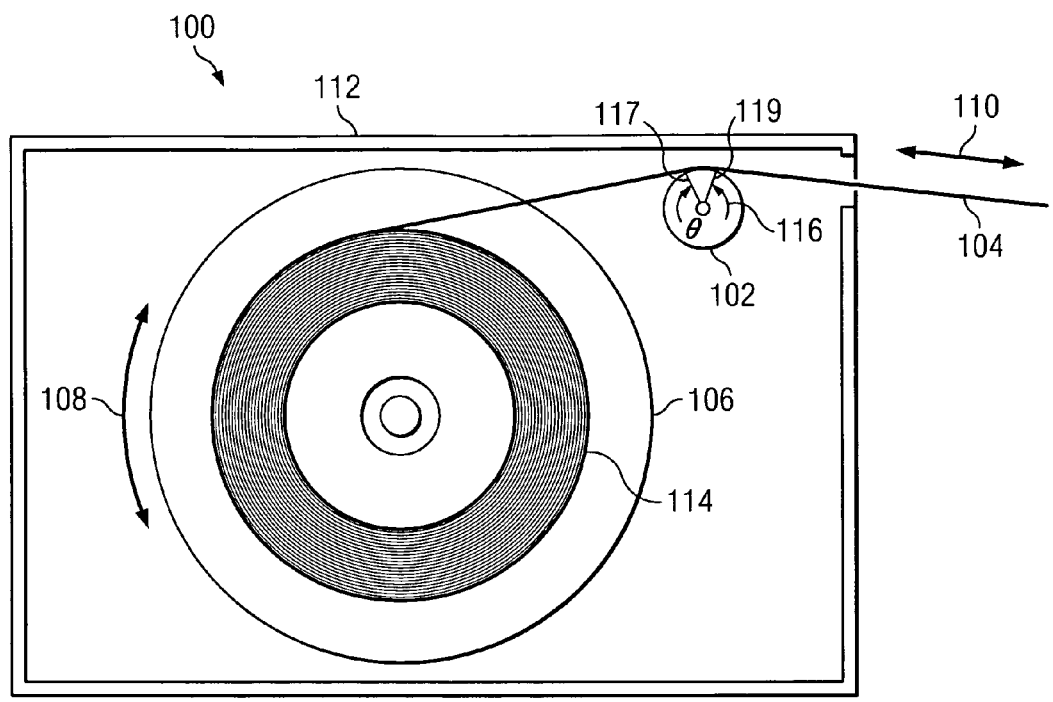
FIG. 1 shows a tape cartridge having a single guide in which the present invention may be implemented.

FIG. 1 shows a tape cartridge 100 having a single guide 102 in which the present invention may be implemented. Tape 104 winds and unwinds around a reel 106 and moves in and out of the cartridge, as shown by arrows 108 and 110. The reel 106 and guide 102 are disposed within a housing 112. The portion of the tape 104 wrapped around the reel 106 may be referred to as the tape pack 114. As the tape unwinds around the reel, the radius of the tape pack decreases. As the tape winds around the reel, the radius of the tape pack increases. As the radius of the tape pack 114 changes, the angle 116, θ, the angle that tape 104 wrapped around guide 102 subtends at the center of guide 102, also changes. The angle, θ, may be referred to as the wrap angle 116. The wrap angle is also the angle between a first line 117 extending from the center of guide 102 to the point where tape 104 from tape pack 114 initially contacts guide 102, and a second line 119 extending from the center of guide 102 to the point where tape 104 wrapped around guide 102 no longer contacts guide 102.

As the tape is transported over guide 102, low frequency motions in the tape may arise which cause impacts between flanges on the guide and one or more edges of the tape. Impacts may also occur between one or more edges of the tape and other parts of the cartridge. Such edge impacts can cause tape wear and decrease the lifetime of the tape. In addition, the change in wrap angle changes the positioning force that the guide applies on the tape. With the change in positioning force, the effectiveness with which the guide positions the tape also changes.

Figure 2:
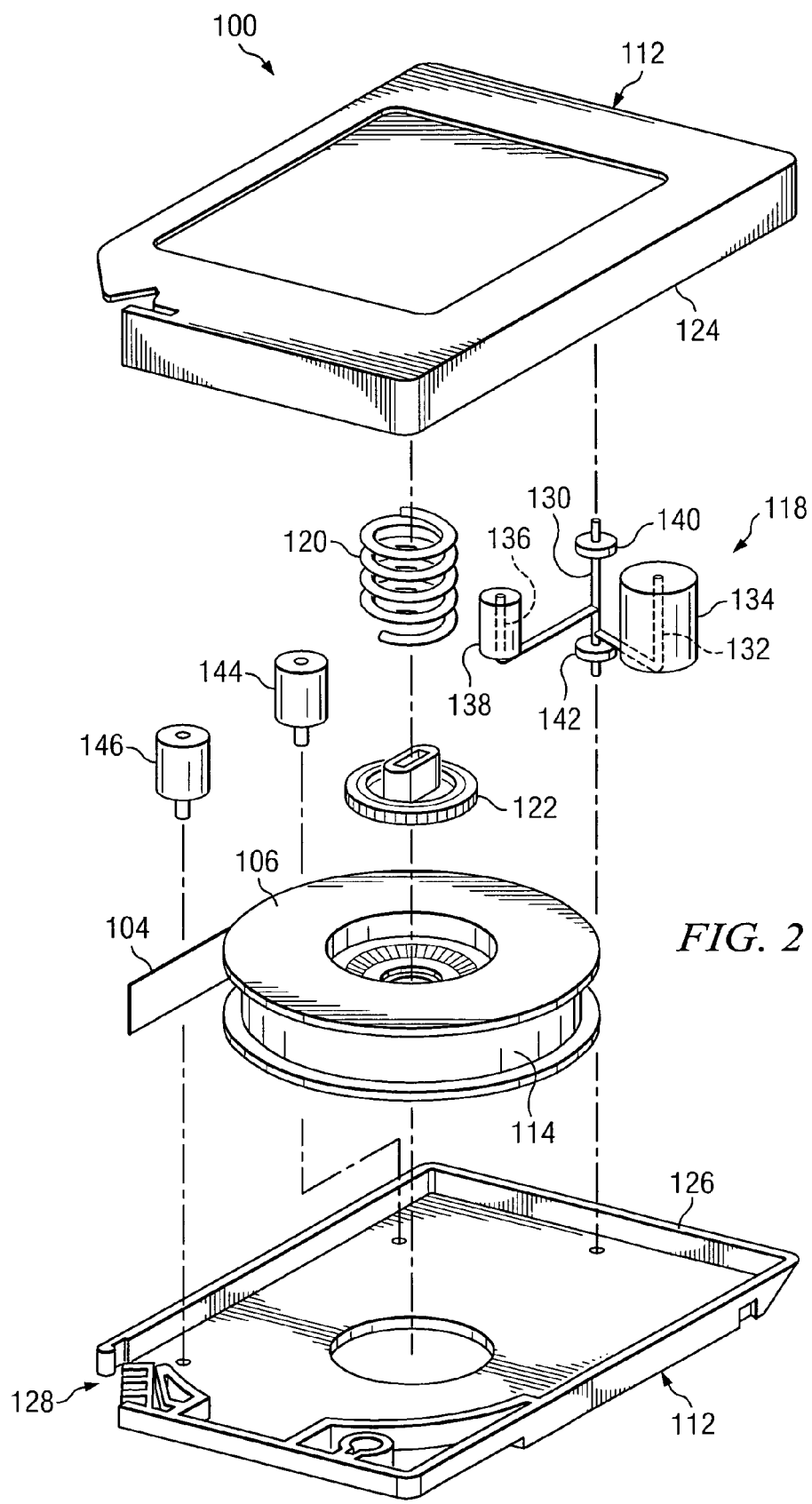
FIG. 2 shows an exploded view of a tape cartridge having an outer guide and an inner roller adapted to adjust a wrap angle around the inner roller, in accordance with a preferred embodiment of the present invention.

FIG. 2 shows an exploded view of a tape cartridge 100 having a roller and guide system 118 adapted to adjust a wrap angle around one of the rollers, in accordance with a preferred embodiment of the present invention. FIG. 2 shows additional details of a tape cartridge, including a reel spring 120, a reel brake 122, an upper portion 124 of housing 112, a lower portion 126 of housing 112, the tape reel 106, the tape 104, and the tape pack 114. The tape 104 moves in and out of an opening 128 in the housing 112.

The roller and guide system 118 is disposed within the housing 112. The roller and guide system 118 includes a spindle 130, an outer arm 132 attached to the spindle, an outer guide 134 operably attached to the outer arm, an inner arm 136 attached to the spindle, and an inner roller 138 operably attached to the inner arm. The terms "inner" and "outer" are relative to the reel, with "inner" referring to a location closer to the center of the reel and "outer" referring to a location further from the center of the reel. The terms "inner" and "outer" are used to more easily identify which guide is being referenced and do not necessarily limit the present invention.

Optionally, a first protrusion 140 and a second protrusion 142 may be attached to the ends of the spindle 130, or may be integrally formed with the spindle. The first and second protrusions are used to operably connect the spindle to the housing. In an illustrative example, the first protrusion 140 and the second protrusion 142 are disks. However, the first and second protrusions may be any suitable structure or means for operably connecting the spindle to the housing.

In an illustrative embodiment, the tape 104 extends from the tape pack 114, around the outer diameter of the outer guide 134, around the outer diameter of a second guide 144, around the outer diameter of a third guide 146, and through the opening 128 in the housing 112. The inner roller 138 abuts the tape pack 114 and rolls along the tape pack as the reel 106 rotates. As the radius of the tape pack changes, the roller 138 is urged to move inwardly and outwardly a first distance relative to the reel. In turn, because the roller is attached to the spindle, the spindle rotates within the housing. Because the spindle is attached to the outer guide, rotation of the spindle causes the guide 134 to be urged to move inwardly and outwardly a second distance relative to the reel. The value of the first distance and the second distance depends on the length of the arms and the radii of the spindle, inner roller, and outer guide.

Figure 3A:
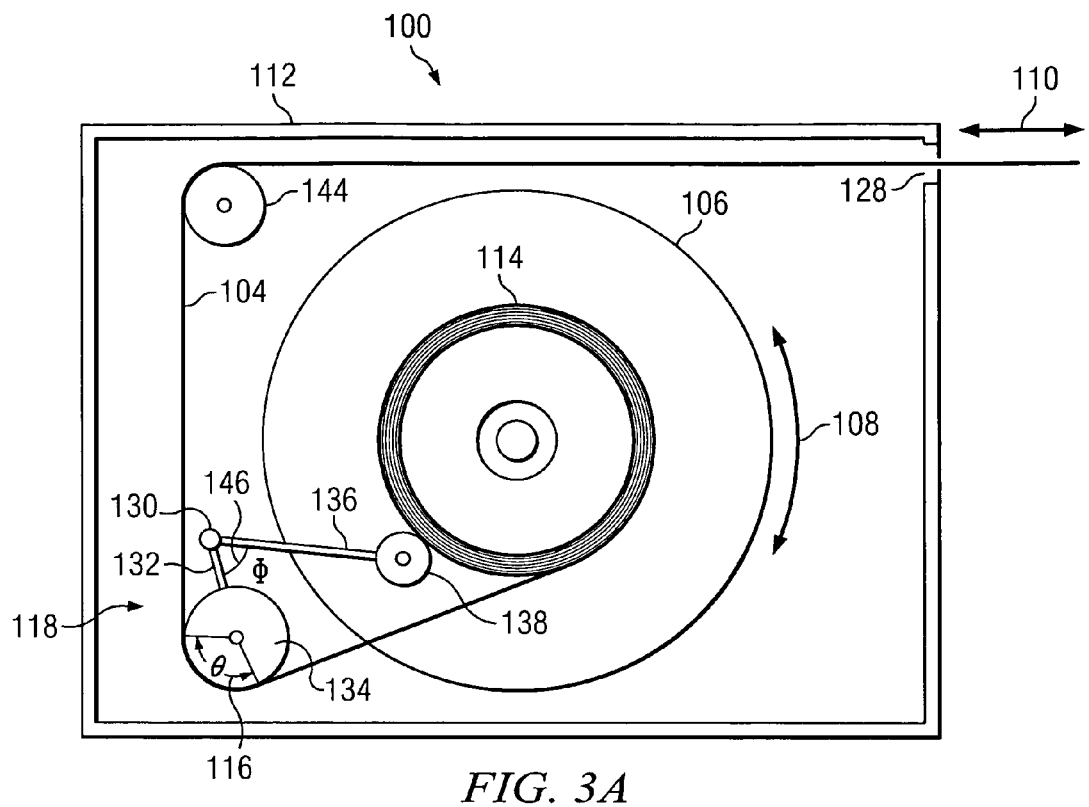
FIG. 3A shows a tape cartridge having a small tape pack, in accordance with a preferred embodiment of the present invention.
Figure 3B:
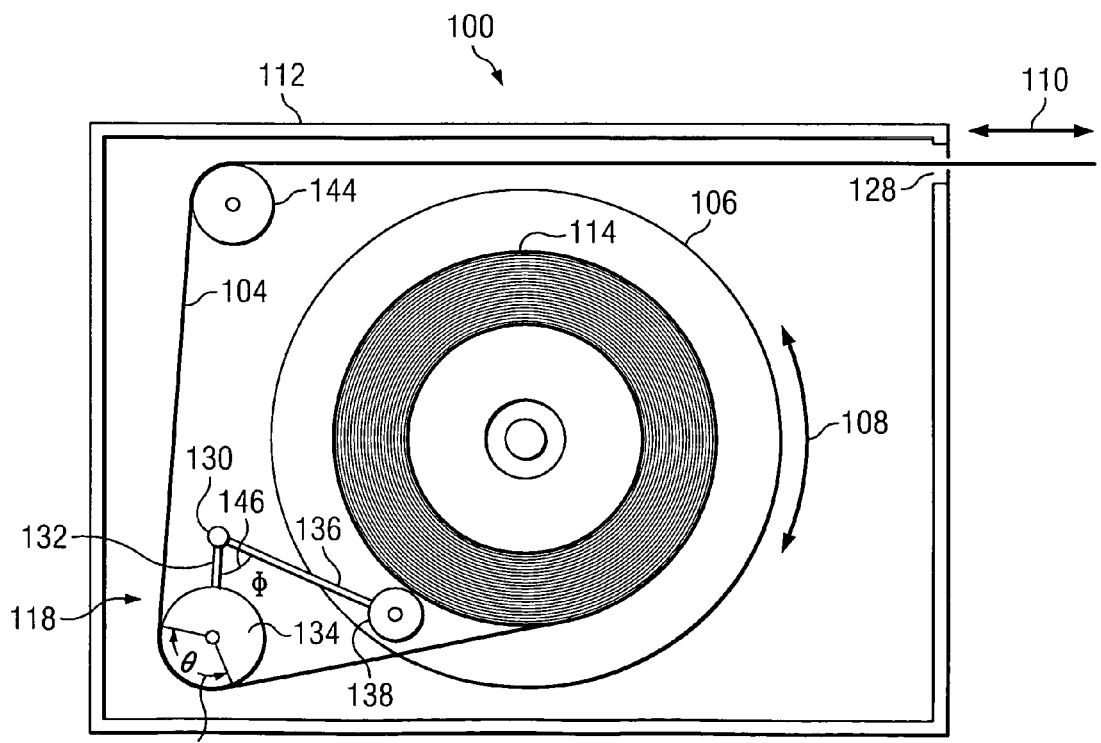
FIG. 3B shows a tape cartridge having a large tape pack, in accordance with a preferred embodiment of the present invention.

Motion of the outer guide relative to the reel changes the wrap angle of the tape around the outer guide. As the outer guide moves away from the tape reel, the wrap angle increases, stays the same, or decreases. If the wrap angle decreases, the decrease is less than the case where the outer guide did not move relative to the reel. Thus, the positioning force applied by the guide does not decrease significantly and the likelihood that edges of the tape will impact other components of the cartridge also decreases relative to the use of a static guide system. FIG. 3A and FIG. 3B show the roller and guide system 118 in use.

Referencing FIG. 3A and FIG. 3B together, FIG. 3A shows a tape cartridge having a small tape pack, in accordance with a preferred embodiment of the present invention and FIG. 3B shows a tape cartridge having a large tape pack, in accordance with a preferred embodiment of the present invention. A tape cartridge 100 contains a roller and guide system 118 having an outer guide 134 and an inner roller 138 adapted to adjust a wrap angle 116 of the tape around the outer guide. The tape extends from the tape pack 114, around a portion of the outer diameter of the outer guide 134, around a portion of the outer diameter of the second guide 144, and through the opening 128 in the cartridge. As the reel 106 rotates, as shown by arrows 108, the tape 104 winds or unwinds around the reel. The tape 104 also moves in and out of the opening 128 as the reel winds or unwinds the tape. Optionally, additional rollers or guides may be provided within the tape cartridge to help guide the tape.

In FIG. 3A, the tape pack 114 is relatively small, or the reel is nearly empty. As the reel 106 winds the tape, the radius of the tape pack increases to a larger size, as shown in FIG. 3B. Without the roller and guide system 118, as the radius of the tape pack increases the wrap angle 116 (θ) of the tape 104 around the outer guide 134 would decrease.

With the roller and guide system 118, as the radius of the tape pack increases, the inner roller 138 is urged outwardly relative to the reel 106. The inner roller 138 is operably connected to the rigid inner arm 136, thereby causing spindle 130 to rotate. As the spindle rotates, the outer arm 132 is also urged outwardly relative to the reel 106. Because the outer guide 134 is operably attached to the outer arm 132, and because the tape 104 extends around a portion of the outer diameter of the outer guide 134, the tape is also urged outwardly relative to the reel 106. In turn, the wrap angle 116 increases relative to a static guide or roller system.

The actual wrap angle 116, θ, may increase, decrease, or remain the same as the radius of the tape pack changes. However, the wrap angle always increases relative to a static system of guides. Thus, even if the actual wrap angle decreases slightly, the wrap angle of the roller and guide system shown herein will be greater than the wrap angle of a static guide. Increasing the wrap angle increases the positioning force applied by the self-centering guide on the tape, provides more guidance for the tape, and decreases the likelihood of impact between tape edges and other components of the tape cartridge. Thus, increasing the wrap angle helps accurately guide the tape around guides in the tape cartridge.

The arm angle, Φ 146, between the outer arm and the inner arm is preselected to control the distance the outer guide 134 moves relative to the reel 106 as the radius of the tape pack changes. Increasing the arm angle, Φ 146, between the two arms increases the distance the outer guide moves relative to the reel until a maximum arm angle of 180° is reached.

The distance the outer guide 134 moves relative to the reel 106 as the radius of the tape pack changes may be further adjusted by adjusting the length of the outer arm, the length of the inner arm, or the length of both arms. As the length of the inner arm or the outer arm increases, the distance the outer guide moves increases. In turn, an increase in the distance the outer guide moves increases the wrap angle.

The distance the outer guide 134 moves relative to the reel 106 as the radius of the tape pack changes may be further adjusted by adjusting the radii of the inner roller 136, the outer guide 134, or both the roller and the guide. As the radii of the inner roller or the outer guide increases, the wrap angle increases. The wrap angle particularly is affected by the radius of the outer guide, as the tape extends around a portion of the outer guide.

Maximizing the change in the wrap angle as the tape pack radius changes is not necessarily desirable. Instead, factors such as the radius of the inner roller, the radius of the outer guide, the length of the guide arm, the length of the roller arm, and the angle between the guide arm and the roller arm are preselected such that the wrap angle will remain within a predetermined range for a given change in the radius of the tape pack. In an illustrative embodiment, these factors are preselected such that the wrap angle remains within the range of about 75° to about 90°. However, the factors described above may be adjusted so that the wrap angle is urged to remain in a range between an angle of less than 75° to an angle of greater than 90°, or to any preselected range of wrap angles.

Figure 4:
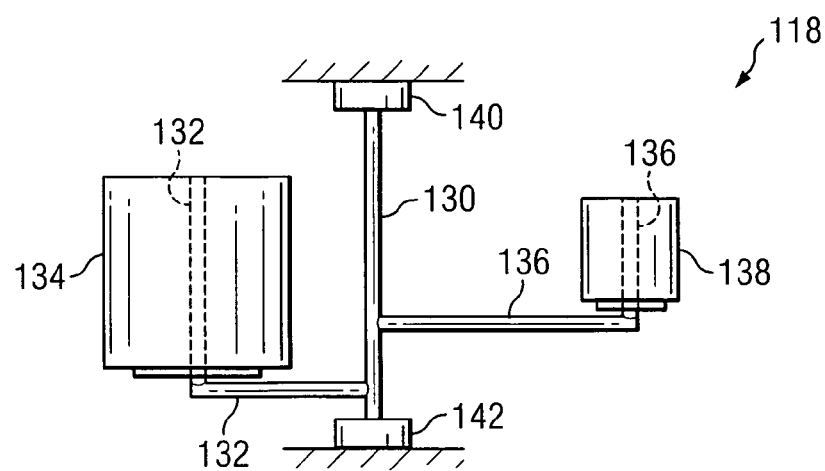
FIG. 4 shows a view of the roller and guide system shown in FIG. 2 through FIG. 3B, in accordance with a preferred embodiment of the present invention.

FIG. 4 shows a view of the roller and guide system 118 shown in FIG. 2 through FIG. 3B, in accordance with a preferred embodiment of the present invention. The roller and guide system 118 has a spindle 130 that rotates within the tape cartridge housing. A first protrusion 140, preferably a disk, and a second protrusion 142, preferably a disk, secure the spindle within the housing. An outer arm 132 extends from the spindle and bends about 90° in order to allow the outer guide 134 to be operably attached to the outer arm. An inner arm 136 extends from the spindle 130 and bends about 90° in order to allow the inner roller 138 to be operably attached to the inner arm. The angled arms may be made straight if some means is provided to operably connect the arms to the outer roller and inner guide accordingly. For example, if a slot is provided in the roller or guide, then an arm may extend through the slot and operably connect to an axle about which the roller or guide rotates.

In an illustrative embodiment, the spindle is operably attached to a spring. The spring urges the spindle to rotate in a direction such that the inner roller 138 is urged gently against the tape pack. The spring constant of the spring is selected to be sufficiently weak that the inner roller will move outwardly relatively to the reel as the radius of the tape pack increases, without applying an unacceptable pressure to the tape pack.

Figure 5:
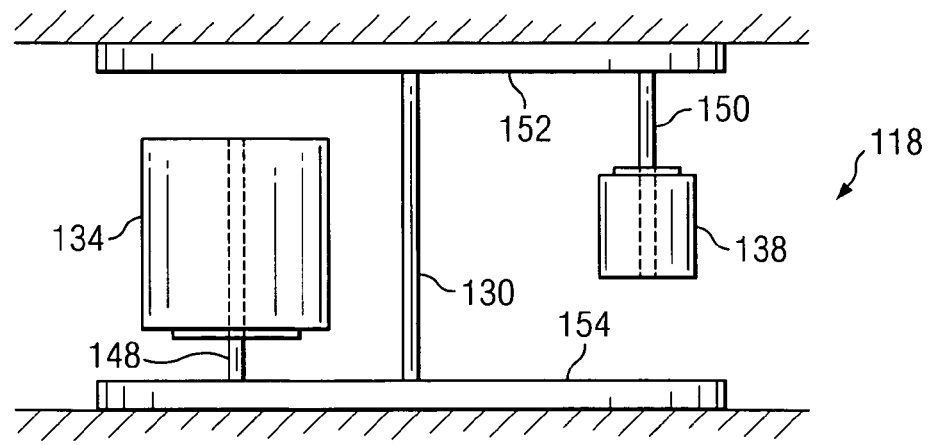
FIG. 5 shows an alternative roller and guide system, in accordance with a preferred embodiment of the present invention.

FIG. 5 shows an alternative roller and guide system 118, in accordance with a preferred embodiment of the present invention. The roller and guide system 118 shown in FIG. 5 shows that the guides need not be connected directly to the spindle via arms. Instead, the inner roller 138 is connected to a first disk 152 via an inner post 150 and the outer guide 134 is connected to a second disk 154 via an outer post 150. In turn, both the first disk 152 and the second disk 154 are connected to or integrally formed with the spindle 130. The operation of this embodiment is shown in more detail in FIG. 6.

The inner post 150 is shown extending from the first disk 152 and the outer post 148 is shown extending from the second disk 154. However, either the inner post or the outer post may extend from either disk. Thus, the inner post 150 may extend from the second disk 154, the outer post 148 may extend from the first disk 152, or both posts may extend from either the first disk or the second disk.

In addition, the design of FIG. 5 will operate with only one disk. In this case, both posts extend from the one disk. Furthermore, either disk may take any shape suitable for connecting both posts and the spindle such that the rotation of the spindle 130 will cause the rotation of the inner roller 138 and the outer guide 134 around a the axis of the spindle. Thus, the disk may be any means for connecting the inner roller, the outer guide, and the spindle such that the rotation of the spindle causes the rotation of both roller and guide around a common axis. Whatever the case, when the inner roller is moved as the radius of the tape pack changes, the spindle rotates, and the outer guide is moved inwardly or outwardly relative to the reel.

Figure 6:
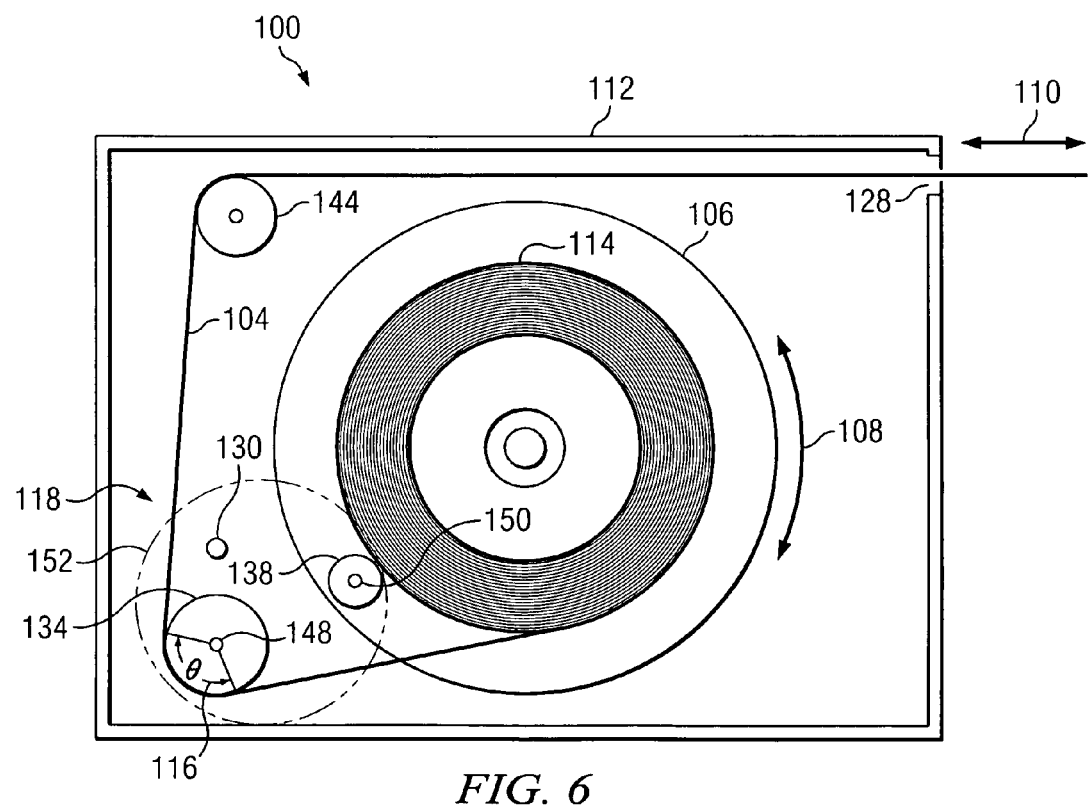
FIG. 6 shows a top-view of the alternative roller and guide system of FIG. 5.

FIG. 6 shows a top-view of the alternative roller and guide system of FIG. 5. Like the embodiments shown in FIG. 2 through FIG. 4, the inner roller 138 rolls against the tape pack 114. As the radius of the tape pack 114 changes, the inner roller 138 moves inwardly or outwardly relative to the reel 106. Because the inner roller 138 is connected to the first disk 152 (shown in phantom to indicate its position out of the page), the inward or outward movement of the inner roller causes the spindle 130 to rotate. In turn, because the outer guide 134 and the spindle are connected to the second disk (not shown in FIG. 6), the outer guide will also move inwardly or outwardly accordingly. Thus, as tape 104 winds or unwinds around the reel 106, the wrap angle 116, θ, changes as described in relation to FIG. 3A and FIG. 3B.

The alternative embodiment shown in FIG. 5 and FIG. 6 shows that different roller and guide systems may be used to implement the present invention. In general, any suitable means for causing the outer guide to move inwardly or outwardly relative to the reel in response to a corresponding movement of the inner roller may be used. Similarly, any suitable means for causing the inner roller to move inwardly or outwardly relative to the reel in response to a change in the radius of the tape pack may be used. In addition, the inner roller need not be a roller, but may be a static object. If the coefficient of friction between the tape pack and the static object is sufficiently low, then a roller need not be used.

In addition, multiple roller and guide systems may be used within a tape cartridge. For example, the second guide 144 shown in FIG. 3A, FIG. 3B, and FIG. 6 may be replaced with a roller and guide system 118 shown in those figures. In this way, the wrap angle around the third guide 144 may be adjusted as the radius of the tape pack changes. In general, one or more roller and guide systems may be provided within a tape cartridge in order to adjust the wrap angle around all guides. Thus, the impact of the edges of the tape against other components of the cartridge may be minimized.

In an illustrative embodiment, each guide, including the inner roller, the outer guide, the second guide, and the third guide may all comprise flangeless guides as shown in our application Self-Centering Tape Guide for Transport of Tape Media in a Tape Path with Reduced Contact Between Tape Edge and Guide Flanges, U.S. patent application Ser. No. 11/027,543, filed Dec. 30, 2004, which is hereby incorporated by reference. In addition, each guide may be a simple roller, a flanged guide, or any other roller and guide suitable for directing the motion of tape within a tape cartridge.

In addition, the present invention may be used in other systems in which a length of material is wrapped around an object. Thus, the roller and guide system shown herein need not be used only in the context of magnetic tape data storage systems. For example, the roller and guide systems shown herein may be implemented in video cassette recorder (VCR) cartridges, sound tape cartridges, and other systems. In addition, the tape need not be tape, but may also be cable, rope, twine, yarn, thread, cloth, or any other object that wraps around an object such as a cylinder or reel. Thus, the present invention may be implemented in pulley systems, winches, and other similar systems.

The present invention provides for a system of rollers and guides that adjusts a wrap angle of tape around a guide in a tape cartridge. The present invention provides several advantages, including adjusting the wrap angle of the tape around one or more guides in the cartridge. The wrap angle of the tape is maintained within a predetermined range even as the radius of the tape pack increases, with the wrap angle increasing relative to the case where a static guide system is used. Thus, impacts between the edges of the tape and other components of the cartridge is reduced, the tape is better guided within the tape cartridge, and the overall lifetime of the tape is increased. Thus, thinner tape may be used to store more data in a single magnetic tape storage cartridge. In addition, the reel may be driven at higher angular speeds to increase the speed at which data may be accessed or written.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A tape cartridge comprising:
   a reel around which tape winds and unwinds, wherein the mass of tape wound around the reel comprises a tape pack;
   a roller disposed to roll against the outer diameter of the tape pack;
   a means for allowing the roller to move a first distance relative to the reel in response to a change in the radius of the tape pack; and
   a guide disposed a second distance from the reel, wherein the tape extends from the tape pack around a portion of the outer diameter of the guide; and
   a means for causing the guide to move a third distance relative to the reel in response to the roller moving the first distance.

2. The tape cartridge of claim 1 wherein the means for allowing the roller to move a first distance comprises a first arm attached to the roller and a spindle attached to the first arm, wherein the spindle rotates as the radius of the tape pack changes.

3. The tape cartridge of claim 2 wherein the means for causing the guide to move a third distance comprises a second arm attached to the guide and to the spindle, wherein the guide is moved as the spindle rotates.

4. A tape cartridge comprising:
   a housing;
   a reel operable to rotate within the housing;
   a tape operable to wind and unwind around the reel, wherein a mass of tape wound around the reel comprises a tape pack;
   a spindle operably attached to the housing, said spindle operable to rotate within the housing;
   a first guide disposed within the housing such that the first guide moves inwardly and outwardly relative to the reel in response to rotation of the spindle;
   wherein tape extends from the tape pack and around a portion of the outer diameter of the first guide; and
   a roller disposed within the housing such that the roller moves inwardly and outwardly relative to the reel in response to rotation of the spindle, said roller further disposed such that the roller rolls against an outer diameter of the tape pack.

5. The tape cartridge of claim 4 wherein the first guide comprises a flangeless guide.

6. The tape cartridge of claim 4 wherein the first guide is attached to the spindle via a first arm and the roller is attached to the spindle via a second arm.

7. The tape cartridge of claim 4 further comprising a second guide disposed within the housing, wherein the tape extends from the first guide around a portion of the outer diameter of the second guide.

8. The tape cartridge of claim 7 wherein the second guide comprises a flangeless guide.

9. The tape cartridge of claim 4 further comprising:
   a second spindle operably attached to the housing, said second spindle operable to rotate within the housing;
   a second guide disposed within the housing such that the second guide moves inwardly and outwardly relative to the reel in response to rotation of the second spindle;
   wherein tape extends from the tape pack, around a portion of the outer diameter of the first guide, and around a portion of the outer diameter of the second guide; and
   a second roller disposed within the housing such that the second roller moves inwardly and outwardly relative to the reel in response to rotation of the second spindle, said roller further disposed such that the second roller rolls against the outer diameter of the tape pack.

10. The tape cartridge of claim 9 wherein the second guide comprises a flangeless guide.

11. The tape cartridge of claim 9 further comprising a third guide disposed within the housing, wherein the tape extends from the second guide and around a portion of the outer diameter of the third guide.

12. The tape cartridge of claim 11 wherein the third guide comprises a flangeless guide.

13. A tape cartridge comprising:
   a housing;
   a reel operable to rotate within the housing;
   a tape operable to wind and unwind around the reel, wherein a mass of tape wound around the reel comprises a tape pack;
   a spindle operably attached to the housing, said spindle operable to rotate within the housing;
   a first arm attached to the spindle;
   a second arm attached to the spindle;
   a roller operably attached to the first arm, said roller disposed to roll against the tape pack;
   a first guide operably attached to the second arm, wherein tape extends from the tape pack and around a portion of the outer diameter of the first guide;
   wherein as the radius of the tape pack changes, the roller moves a first distance relative to the reel, which causes the spindle to rotate, which in turn causes the first guide to move a second distance relative to the reel.

14. The tape cartridge of claim 13 further comprising a second guide disposed within the housing, wherein tape extends from the first guide and around a portion of the outer diameter of the second guide.

15. The tape cartridge of claim 13 further comprising:
   a second spindle operably attached to the housing, said second spindle operable to rotate within the housing;
   a second guide disposed within the housing such that the second guide moves inwardly and outwardly relative to the reel in response to rotation of the second spindle;
   wherein tape extends from the tape pack, around a portion of the outer diameter of the first guide, and around a portion of the outer diameter of the second guide; and
   a second roller disposed within the housing such that the second roller moves inwardly and outwardly relative to the reel in response to rotation of the second spindle, said second roller further disposed such that the second roller rolls against the outer diameter of the tape pack.

16. The tape cartridge of claim 15 further comprising:
   a third guide disposed within the housing, wherein the tape extends from the second guide and around a portion of the outer diameter of the third guide.

* * * * *